United States Patent
Ferrari et al.

(10) Patent No.: US 10,533,066 B2
(45) Date of Patent: Jan. 14, 2020

(54) BLOCK COPOLYMERS THAT CAN BE USED AS PLASTICISERS

(71) Applicant: CHRYSO, Issy les Moulineaux (FR)

(72) Inventors: Lucia Ferrari, Orsay (FR); Frederic Leising, Avilly Saint Leonard (FR)

(73) Assignee: CHRYSO, Issy les Moulineaux (FR)

( * ) Notice: Subject to any disclaimer, the term of this patent is extended or adjusted under 35 U.S.C. 154(b) by 265 days.

(21) Appl. No.: 15/506,428

(22) PCT Filed: Aug. 27, 2015

(86) PCT No.: PCT/EP2015/069688
§ 371 (c)(1),
(2) Date: Feb. 24, 2017

(87) PCT Pub. No.: WO2016/030482
PCT Pub. Date: Mar. 3, 2016

(65) Prior Publication Data
US 2017/0253685 A1    Sep. 7, 2017

(30) Foreign Application Priority Data
Aug. 28, 2014 (FR) .................. 14 58083

(51) Int. Cl.
C08F 283/06 (2006.01)
C08F 293/00 (2006.01)
C08L 71/02 (2006.01)
C08F 230/02 (2006.01)
C04B 24/32 (2006.01)
C08G 65/332 (2006.01)

(52) U.S. Cl.
CPC ............ *C08F 283/06* (2013.01); *C04B 24/32* (2013.01); *C08F 230/02* (2013.01); *C08F 293/005* (2013.01); *C08G 65/332* (2013.01); *C08L 71/02* (2013.01); *C08G 2261/126* (2013.01); *C08L 2666/04* (2013.01)

(58) Field of Classification Search
CPC ..... C08F 283/06; C04B 24/32; C08G 81/025; C08L 71/02
See application file for complete search history.

(56) References Cited

U.S. PATENT DOCUMENTS

| | | | |
|---|---|---|---|
| 5,011,892 A | 4/1991 | Engelhardt et al. | |
| 5,147,506 A | 9/1992 | Mongoin et al. | |
| 5,879,445 A | 3/1999 | Guicquero et al. | |
| 6,545,067 B1 * | 4/2003 | Buchner | C04B 24/121 524/2 |
| 7,425,596 B2 * | 9/2008 | Kraus | C08F 293/005 525/329.7 |
| 7,850,950 B2 * | 12/2010 | Giroud | A61K 8/90 424/70.1 |
| 8,536,292 B2 * | 9/2013 | Mongoin | C08F 265/00 528/25 |
| 9,012,589 B2 * | 4/2015 | Maitrasse | C04B 24/243 528/42 |
| 2004/0010074 A1 * | 1/2004 | Cadena | A61K 8/90 524/555 |
| 2005/0181225 A1 * | 8/2005 | Destarac | C08F 293/005 428/544 |
| 2009/0306297 A1 | 12/2009 | Destarac et al. | |
| 2010/0029853 A1 | 2/2010 | Destarac | |
| 2014/0039098 A1 | 2/2014 | Chougrani et al. | |
| 2014/0134116 A1 * | 5/2014 | Wang | A61K 8/90 424/57 |
| 2015/0337143 A1 * | 11/2015 | Bressy | C09D 153/00 524/547 |
| 2016/0214896 A1 * | 7/2016 | Cadix | C09K 8/035 |

FOREIGN PATENT DOCUMENTS

| | | |
|---|---|---|
| EP | 0 400 283 A2 | 12/1990 |
| FR | 2 637 511 A1 | 4/1990 |
| FR | 2 696 736 A1 | 4/1994 |
| FR | 2 892 420 A1 | 4/2007 |
| FR | 2 974 090 A1 | 10/2012 |
| FR | 3011555 A1 * | 4/2015 ............ C04B 28/02 |
| WO | 2006/125892 A1 | 11/2006 |
| WO | 2007/085623 A1 | 8/2007 |
| WO | 2015/144886 A1 | 10/2015 |

OTHER PUBLICATIONS

Pfukwa et al. "Facile End Group Modification of RAFT Made Polymers by Radical Exchange with Hydrogen Peroxide", Polymer Preprints, 2008, 49(2), pp. 117-118. (Year: 2008).*

A. Mayer; M. Antonietti: "Investigation of polymer-protected noble metal nanoparticles by transmission electron microscopy: control of particle morphology and shape", Colloid & Polymer Science, vol. 276, No. 9, Oct. 1, 1998 (Oct. 1, 1998), DE, pp. 769-779, XP055124343, ISSN: 0303-402X.

Helmut Colfen et al.: "Crystal Design of Calcium Carbonate Microparticles Using Double-Hydrophilic Block Copolymers", Langmuir, vol. 14, No. 3, Jan. 17, 1998 (Jan. 17, 1998), pp. 582-589, XP055165910, ISSN: 0743-7463, DOI: 10.1021/la970765t.

(Continued)

*Primary Examiner* — Nicole M. Buie-Hatcher
(74) *Attorney, Agent, or Firm* — Young & Thompson

(57) ABSTRACT

Disclosed is a block copolymer including:
- at least one block A not including any phosphonate group, and including at least one poly(alkylene oxide) group and
- at least one block B obtained by polymerization of a monomer B1 or of a mixture of monomers with ethylenic unsaturation including at least one monomer B1, wherein a monomer B1 is a monomer with ethylenic unsaturation including at least one phosphonate function, to its preparation method by RAFT controlled radical polymerization and to its uses.

6 Claims, 1 Drawing Sheet

(56) References Cited

OTHER PUBLICATIONS

Milos Sedlak et al.: "Synthesis of Double-Hydrophilic Block Copolymers with Hydrophobic Moieties for the Controlled Crystallization of Minerals", Macromolecular Chemistry and Physics, vol. 202, No. 4, Mar. 7, 2001 (Mar. 7, 2001), pp. 587-597, XP055165716, ISSN: 1022-1352, DOI: 10.1002/1521-3935(20010201)202:4<587::AID-MACP587>3.0.CO;2-F.

International Search Report, dated Oct. 29, 2015, from corresponding PCT application.

FR Search Report, dated Feb. 2, 2015, from corresponding FR application.

* cited by examiner

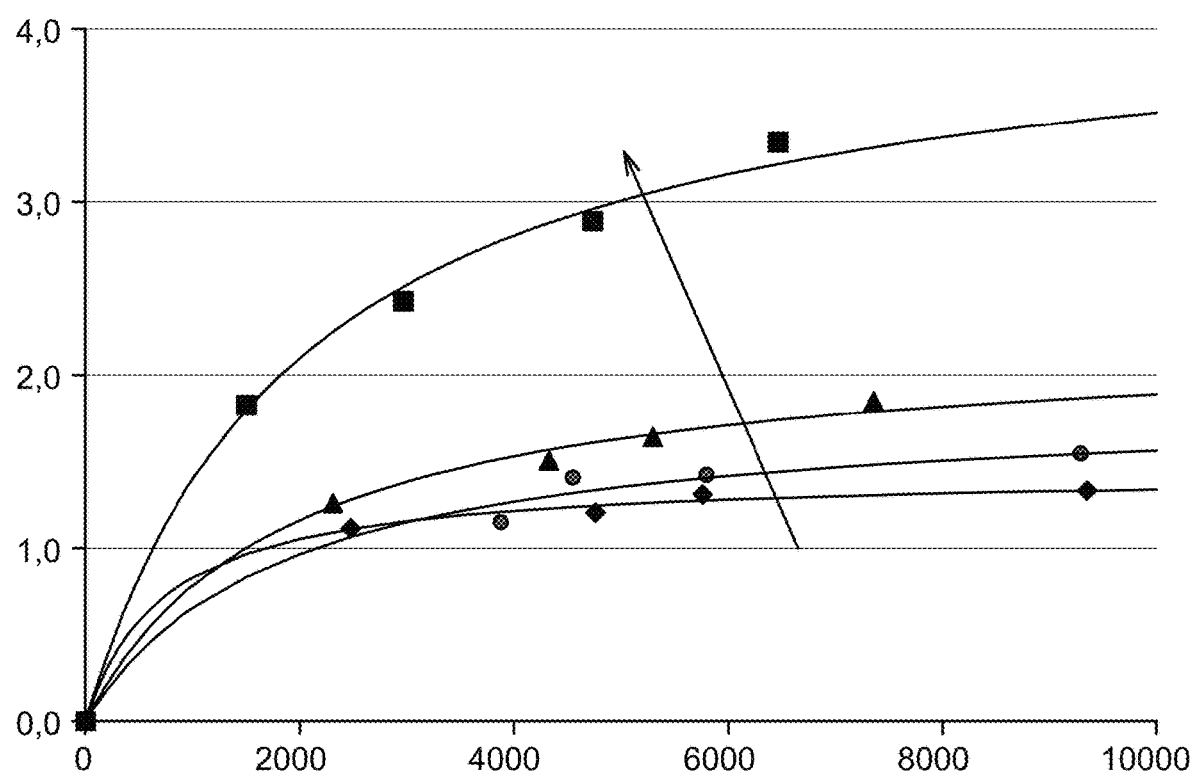

BLOCK COPOLYMERS THAT CAN BE USED AS PLASTICISERS

The present invention relates to polymers, their preparation method and their uses, notably as a dispersant agent of mineral particles, as an agent fluidifying suspensions of mineral particles, like an adhesion promoter, like an anti-corrosion agent, like a flame retardant, like a stabilizing agent during the milling of mineral particles, or as an anti-scale agent. The polymers are particularly useful as a fluidifying agent for compositions comprising a hydraulic binder such as cement.

Dispersants or fluidifiers are usually added into aqueous suspensions of mineral particles in order to lower the viscosity thereof or for reducing the water content of these suspensions. The relevant suspensions are notably suspensions of calcium salts or calcium sulfate, or suspensions of mineral oxides, such as titanium dioxide or iron oxide. It is only after having been fluidified that these suspensions may be used for the preparation of diverse industrial products including paints, products for coating paper and formulations for rubbers and for synthetic resins.

Fluidifiers, also called plasticizers or super-plasticizers are usually added to hydraulic binders such as cements, plasters, calcium sulfates or lime, in order to reduce the water content of the hydraulic binder slurry. Consequently, the hydraulic binder slurry has, after hardening, a denser structure, which is expressed by a high mechanical strength. In this scope, mention may be made of the use of comb copolymers of the polycarboxylate type as a super-plasticizer, which has made possible the preparation of fluid concretes, even with less water than required for hydrating constituents of the cement. These super-plasticizers are branched polymers for which the main chain includes carboxylic groups and for which the side chains consist of long sequences of the polyether type, in particular polyethylene oxide, like for example poly [(meth)acrylic acid—grafted with—polyethylene oxide].

Other polymeric super-plasticizers for the fluidification of concrete mortars have been developed, such as single chains of poly (ethylene oxide) bis-phosphonates as described in patent FR 2 696 736, and marketed by CHRYSO under the name of CHRYSO® Fluid Optima 100.

Other polymeric super-plasticizers comprising phosphonated side groups are also described in applications FR 2 892 420 and FR 2 974 090. The polymers which are described therein are not block copolymers.

The application FR 2 892 420 describes comb polymers for which the phosphonic groups are attached on the main backbone with amino-bis-alkylenephosphonic ball joints and obtained:
 either by radical copolymerization of a compound with ethylenic unsaturation comprising a phosphonate group, with a polyoxyalkylated compound with ethylenic unsaturation and optionally a carboxylic acid or an ester with ethylenic unsaturation in the presence of a catalyst,
 or by a so-called «postgrafting» method comprising the grafting of phosphonated and/or polyoxyalkylated side groups on a polymer comprising a hydrocarbon chain and carboxylic groups.

The synthesis of the compound with ethylenic unsaturation comprising an amino-bis-alkylenephosphonic group is achieved with a MOEDRITZER-IRANI reaction which requires the use of formaldehyde.

The application FR 2 974 090 describes comb polymers for which the lateral groups comprise gem-bisphosphonated groups, obtained:
 either by radical copolymerization of a monomer comprising a gem-bisphosphonate group, of a monomer comprising a polyoxyalkylated group and of a monomer bearing a carboxylic group in the presence of a catalyst,
 or by a so-called «postgrafting» method comprising the grafting of gem-bisphosphonated side groups on a polymer comprising a hydrocarbon chain and carboxylic and polyoxyalkylated groups.

The preparation of polymers from monomers with ethylenic unsaturation comprising a phosphonate function, notably from a monomer comprising a vinyl phosphonate function is often delicate. In particular, the preparation of polymers from vinylphosphonic acid and from dimethyl or diethyl vinylphosphonate is difficult, since these monomers have low polymerizability due to the existence of undesirable secondary reactions, in the presence of radicals. The synthesis of homopolymers or copolymers comprising the monomers bearing phosphonate functions is generally carried out through a conventional radical route, i.e. by an uncontrolled mechanism.

From among the main «live» or controlled radical polymerization techniques, mention may be made of radical polymerization by atom transfer (ATRP), radical polymerization controlled by stable radicals of the nitroxyl type (NMP), polymerization by degenerative iodine transfer (ITP) and polymerization by reversible transfer by addition-fragmentation (RAFT).

The applications WO 2006/125892 and WO 2007/085623 describe a block copolymer comprising:
 at least one block A obtained by polymerization of a mixture of monomers with ethylenic unsaturation ($A_0$) not comprising any monomers with vinyl phosphonate functions, and
 at least one block B obtained by polymerization of a mixture of monomers with ethylenic unsaturation ($B_0$) comprising at least one monomer $B_1$ bearing at least one vinyl phosphonate function.

This block copolymer is without any polyoxyalkylated groups.

In the application WO 2007/085623, this copolymer is obtained by a polymerization method with transfer of iodine (ITP) comprising the following steps:
(a) a radical polymerization leading to the obtaining of a functionalized polymer at its end with an iodine atom useful as a transfer agent in a controlled radical polymerization reaction is achieved, said step being conducted by putting into contact:
 monomeric ethylenically unsaturated molecules,
 a source of free radicals, and
 at least one iodinated transfer agent,
(b) a radical polymerization step is achieved subsequently to step (a), or several successive steps of radical polymerizations, said step(s) each consisting of carrying out a radical polymerization leading to the obtaining of a block copolymer functionalized at its end with an iodine atom useful as a transfer agent in a radical polymerization reaction, said steps(s) being conducted by putting into contact:
 ethylenically unsaturated monomeric molecules for which at least one is different from those applied in the preceding step,
 a source of free radicals, and the functionalized polymer stemming from the preceding step;

wherein one of the polymerization steps (a) and (b) defined above leads to the formation of block B, and another one of the polymerization steps of steps (a) and (b) leads to the formation of block A.

In the application WO 2006/125892, this copolymer is obtained by a controlled radical polymerization method of the RAFT type comprising the following steps:

(a) a controlled radical polymerization is achieved leading to the obtaining of a functionalized polymer useful as a control agent in a controlled radical polymerization reaction, said step being conducted by putting into contact:
ethylenically unsaturated monomeric molecules,
a source of free radicals, and
at least one control agent notably selected from among dithioesters, thioethers-thiones, trithiocarbonates, dithiocarbamates including N,N-dialkyldithiocarbamates, dithiocarbazates and xanthates, preferably O-ethyl-S-(1-methoxycarbonyl)ethyl) xanthate, (b) a controlled radical polymerization step is achieved subsequently to step (a) or several successive steps of controlled radical polymerizations, said step(s) each consisting of carrying out a controlled radical polymerization leading to the obtaining of a functionalized block copolymer useful as a control agent in a controlled radical polymerization reaction, said step(s) being conducted by putting into contact:
ethylenically unsaturated monomeric molecules different from those applied in the preceding step,
a source of free radicals, and
the functionalized polymer from the preceding step, wherein one of the polymerization steps (a) and (b) defined above leads to the formation of block B, and another one of the polymerization steps of steps (a) and (b) leads to the formation of block A.

In the examples, a diblock polyacrylic acid—b-polyvinylphosphonic acid P(AA)-b-P(AVP) was prepared.

According to a first object, the invention relates to a block copolymer (also called a sequenced copolymer) comprising:
at least one block A not comprising any phosphonate group and comprising at least one poly (alkylene oxide) group, and
at least one block B obtained by polymerization of a monomer B1 or of a mixture of monomers with ethylenic unsaturation comprising at least one monomer B1, wherein a monomer B1 is a monomer with ethylenic unsaturation comprising at least one phosphonate function.

Preferably, the block copolymer according to the invention is with diblocks or triblocks. The diblock copolymers are particularly preferred. The block polymer may comprise a block consisting of a comb polymer, which comprises a main chain and pendant groups. Generally, at least one of the blocks of the block copolymer is not a comb copolymer.

The blocks of the block copolymer are bound through a covalent bond. The blocks may be bound together with a junction unit which does not correspond to a unit consisting of blocks A or B.

The block copolymer according to the invention comprises at least one block A comprising at least one poly (alkylene oxide) group. The block copolymer according to the invention may comprise several blocks A of identical or different natures.

Preferably, in each block A, each poly (alkylene oxide) group has independently the following formula (I):

$$R_3—(O—R_4)_n—$$ (I)

wherein:
$R_3$ is a hydrogen atom or a monovalent hydrocarbon group including from 1 to 12 carbon atoms and optionally one or several heteroatoms,
n represents an integer from 2 to 500, preferably from 3 to 200,
each $R_4$ represents independently a linear or branched alkylene comprising from 2 to 6 carbon atoms.

In the sense of the present application:
the preferred heteroatoms are oxygen or nitrogen,
phenyl is the preferred aryl,
unless indicated otherwise, the alkyl and alkenyl groups generally include from 1 to 12 carbon atoms, typically from 1 to 6 carbon atoms, the aryl groups generally comprise from 6 to 10 carbon atoms, the alkylaryl or arylalkyl groups generally include from 7 to 12 carbon atoms. The alkyl and alkenyl groups are linear or branched groups.
by halogen atom is meant chlorine, fluorine, bromine or iodine. Preferably the halogen is a chlorine atom.

Within the scope of the invention by the expressions (meth)acrylic, (meth)acrylate, (meth)acrylamide, are respectively meant acrylics and methacrylics, acrylates and methacrylates, acrylamides and methacrylamides.

Preferably, in the formula (I) above, $R_3$ represents a hydrogen atom, an alkyl, an aryl, an alkylaryl or an arylalkyl including from 1 to 12 carbon atoms, wherein the alkyls are linear or branched alkyl groups. Typically, $R_3$ represents H or Me.

Preferably, each $R_4$ represents independently a group $—CH_2—CH_2—$, $—CHCH_3—CH_2—$, $—CH_2—CHCH_3—$ or $—CH_2—CH_2—CH_2—$. The poly (alkylene oxide) groups are then poly(ethylene oxide), poly(propylene oxide) or copolymers thereof. The poly(ethylene oxide)s and the copolymers (ethylene oxide-co-propylene oxide) are particularly preferred poly(alkylene oxide) groups. Typically, the poly(ethylene oxide)s are poly(ethylene oxide) (POE) 350, 750, 1000, 2000, 3000 or 5000.

The block A of the block copolymer according to the invention comprises poly(alkylene oxide) groups, notably of the formula (I) above.

According to a first alternative, the block A typically comprises a main chain, generally a hydrocarbon chain, and side chains (also called pendant groups) for which at least one portion comprises (or consists of) at least one poly (alkylene oxide) group. These poly(alkylene oxide) groups may be bound to the main chain directly or via spacer groups, typically groups comprising ether, ester or amide functions. In this alternative, block A is in the form of a comb polymer.

Typically, the block A is then obtained by polymerization of a monomer A1 or of a mixture of monomers with ethylenic unsaturation comprising at least one monomer A1, wherein a monomer A1 is a monomer with ethylenic unsaturation and comprising at least one poly (alkylene oxide) group. The monomer A1 may for example have the following formula (II):

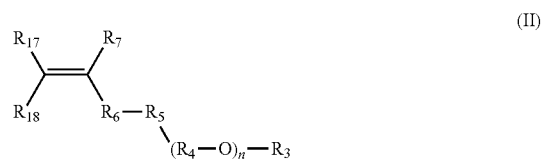

(II)

wherein:
n, $R_3$ and $R_4$ are as defined above,
$R_5$ represents —$CH_2$—, —O— or —$NR_8$— wherein $R_8$ represents H or a linear or branched alkyl group comprising from 1 to 6 carbon atoms, preferably H or Me,
$R_6$ is absent or represents —(C=O)— or —$(CH_2)_q$—, wherein q represents 1, 2 or 3,
$R_7$ represents H or Me, and
$R_{17}$ and $R_{18}$ represent independently H or Me, typically $R_{17}$ and $R_{18}$ represent Me or $R_{17}$ and $R_{18}$ represent H, preferably $R_{17}$ and $R_{18}$ represent H.

From among the monomers A1 of formula (II), the monomers A1 of the following formulae (IIIa), (IIIb), (IIIc) and (IIId) are particularly preferred:

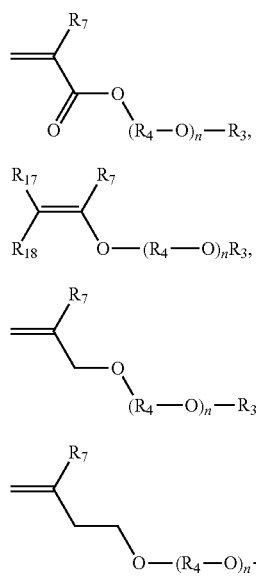

wherein n, $R_7$, $R_3$, $R_4$, $R_{17}$ and $R_{18}$ are as defined above.

The block A may for example be obtained by polymerization of a mixture of monomers with ethylenic unsaturation comprising (or consisting of) a monomer A1 of formulae (IIIa), (IIIb), (IIIc), (IIId) or a mixture thereof.

Preferably, each block A of the block copolymer is obtained by polymerization of a mixture of monomers with ethylenic unsaturation comprising at least 60% by weight, typically at least 80% by weight, for example at least 95% by weight and up to 100% by weight of monomers A1 with ethylenic unsaturation and comprising at least one poly(alkylene oxide) group.

In an embodiment, each block A is obtained by polymerization of a mixture of monomers A1 with ethylenic unsaturation and comprising at least one poly(alkylene oxide) group, for example by polymerization of a monomer of formulae (IIIa), (IIIb), (IIIc) or (IIId) as defined above or of a mixture thereof.

In another embodiment, at least one block A is obtained by polymerization of a mixture of monomers with ethylenic unsaturation comprising:
at least one monomer A1 with ethylenic unsaturation and comprising at least one poly(alkylene oxide) group, notably as defined above, and
at least one other monomer with ethylenic unsaturation (without any poly(alkylene oxide) group).

Typically, at least one block A is obtained by polymerization of a mixture of monomers with ethylenic unsaturation comprising:
from 60 to 100% by weight of a monomer A1 with ethylenic unsaturation and comprising at least one poly(alkylene oxide) group, notably as defined above, and
from 0 to 40% by weight of another monomer with ethylenic unsaturation (without any poly(alkylene oxide) group).

These other monomer(s) with ethylenic unsaturation may independently be:
a monomer A2 without any function which may bind to the calcium ion or to the anionic ions present at the surface of a mineral particle, typically a monomer without any ionic group, or
a monomer A3 comprising:
at least one function which may bind to the calcium ion (typically a monomer comprising an anionic group, for example a carboxylate function), and/or
at least one function which may bind to the anionic ions present at the surface of a mineral particle (typically a monomer comprising a cationic group, for example a quaternary ammonium function).

The monomer A3 is typically the bearer of an ionic group. Preferably, each block A of the block copolymer is obtained by polymerization of a mixture of monomers comprising less than 10% by weight of monomers A3. Preferably, each block A of the block copolymer is obtained by polymerization of a mixture of monomers comprising less than 10% by weight of monomers comprising an ionic group. In the sense of the application, a group is considered as being ionic if it is ionic in an aqueous solution with a pH comprised between 8 and 13. For example, a carboxylic acid function forms a carboxylate function at these pH's and is considered as ionic. From among the ionic groups, mention may be made of the carboxylic acid, carboxylate, quaternary ammonium, sulfonic acid, sulfonate or boronic acid groups.

From among the monomers A2 without any function which may bind to the calcium ion or to the anionic ions present at the surface of a mineral particle, mention may be made of:
mono-alkylesters of ethylenically unsaturated mono-carboxylic acids and di-alkylesters of ethylenically unsaturated di-carboxylic acids (such as mono-alkylesters of acrylic acid, methacrylic acid, itaconic acid, maleic acid, or fumaric acid), preferably obtained by esterification with $C_3$-$0_{10}$ alcohols, such as hydroxypropyl(meth)acrylate, propyl acrylate, n-butyl acrylate, isobutyl acrylate, 2-ethylhexyl acrylate, t-butyl acrylate, n-butyl methacrylate, isobutyl methacrylate, or
amides such as acrylamide or methacrylamide, or
ethylenic monomers comprising a ureido group such as ethylene-urea-ethyl-methacrylamide, or ethylene-urea-ethyl methacrylate, or
cyclic amides of vinylamine, such as N-vinylpyrrolidone and vinylcaprolactam, or
vinylic nitriles containing from 3 to 12 carbon atoms, and notably acrylonitrile or methacrylonitrile, or
vinyl esters of carboxylic acids, like vinyl acetate (VAc), vinyl versatate, or vinyl propionate, or
vinyl or vinylidene halides, for example vinyl chloride, vinyl fluoride, vinylidene chloride and vinylidene fluoride, or
derived styrenic monomers such as styrene, alphamethylstyrene, paramethylstyrene or paratertiobutylstyrene, or aminoalkyl (meth)acrylates, aminoalkyl (meth)acrylamides wherein the amine function is a primary, secondary or tertiary amine, such as dimethyl amino ethyl (meth) acrylate, dimethyl amino propyl (meth)acrylate, ditertiobutyl aminoethyl (meth)acrylate, dimethyl amino methyl (meth)acrylamide, dimethyl amino propyl (meth)acrylamide, ethylene imine, vinylamine, 2-vinylpyridine, 4-vinylpyridine.

Preferably, the monomers A2 are selected from among hydroxyethyl(meth)acrylate, hydroxypropyl(meth)acrylate, acrylamide (Am) or methacrylamide, N-vinylpyrrolidone, styrene, vinyl acetate (VAc), vinyl chloride, vinylidene chloride, vinylidene fluoride or mixtures thereof.

From among the monomers A3 comprising at least one function which may bind to the calcium ion, and/or at least one function able to bind to the anionic ions present at the surface of a mineral particle, mention may be made of:

ethylenic unsaturated mono- and di-carboxylic acids such as acrylic acid, methacrylic acid, itaconic acid, maleic acid and fumaric acid, the ethylenic monomers including a sulfonic acid group or of one of its alkaline or ammonium salts, such as for example vinylsulfonic acid, vinylbenzene sulfonic acid, alpha-acrylamido-methylpropanesulfonic acid, or 2-sulfoethylene-methacrylate, or monomers bearing a boronic acid function such as p-vinylphenyl boronic acid, or cationic monomers selected from among aminoalkyl (meth)acrylates, aminoalkyl (meth)acrylamides wherein the amine function is quaternary, the ammonium salts of diallyldialkyl (as well as salts, the salts being preferably selected so that the counter-ion is a halide like for example a chloride, or a sulfate, a hydrosulfate, an alkylsulfate (for example comprising 1 to 6 carbon atoms), a phosphate, a citrate, a formate, an acetate), such as trimethylammonium ethyl (meth)acrylate chloride, trimethylammonium ethyl acrylate methylsulfate, benzyl dimethylammonium ethyl (meth)acrylate chloride, 4-benzoylbenzyl dimethyl ammonium ethyl acrylate chloride, trimethyl ammonium ethyl (meth)acrylamide chloride, trimethyl ammonium vinylbenzyl chloride; diallyldimethyl ammonium chloride, or salts thereof, or esters of acrylic acid or methacrylic acid with $C_1$-$C_2$ alcohols, such as for example methyl acrylate, ethyl acrylate, methyl methacrylate, ethyl methacrylate. These esters are actually very easily hydrolyzed into a carboxylate function in a basic aqueous medium.

In this first alternative, the block A of the block copolymer according to the invention generally has an average molar mass comprised between 350 and 50,000 g/mol (Mw), preferably between 10,000 and 20,000 g/mol (Mw) as determined by SEC ("size exclusion chromatography", molecular exclusion liquid chromatography) in equivalents of standard poly(ethylene oxide).

Each block A according to this first alternative may independently be a homopolymer (the block A being then obtained by polymerization of a monomer A1 with ethylenic unsaturation and comprising at least one poly(alkylene oxide) group), a random copolymer, an alternating copolymer or a copolymer with a composition gradient.

According to a second alternative, the block A of the block copolymer according to the invention consists in a poly(alkylene oxide), notably in a poly(alkylene oxide) of formula (I) as defined above.

In this second alternative, the block A of the block copolymer according to the invention generally has an average molar mass comprised between 100 and 50,000 (Mw), preferably between 100 and 20,000 (Mw).

When the block copolymer according to the invention comprises several blocks A, each block A may independently be according to the first or the second alternative described above.

The block A of the copolymer does not comprise any phosphonate group, while the block B comprises it. The block A and the block B of the copolymer according to the invention are therefore of different natures.

The block copolymer according to the invention comprises at least one block B obtained by polymerization of a monomer B1 or of a mixture of monomers with ethylenic unsaturation comprising at least one monomer B1, wherein B1 is a monomer with ethylenic unsaturation comprising at least one phosphonate function.

The block B of the block copolymer may be without any poly(alkylene oxide) group.

From among the monomer B1 with ethylenic unsaturation comprising at least one phosphonate function, the compounds of the following formula (IV) may notably be mentioned:

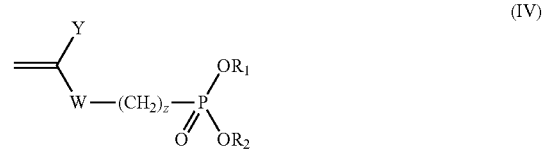

(IV)

wherein:

Y represents:
- a linear or branched alkyl having from 1 to 6 carbon atoms,
- a group —W—$(CH_2)_z$—P(=O)($OR_1$)($OR_2$), or
- a group $(CH_2)_x$—$R_{25}$, wherein x represents an integer comprised between 0 and 4 and $R_{25}$ represents a hydrogen atom, a phenyl or a group —CN or —$CO_2R_9$.

z represents an integer comprised between 0 and 4,

W represents a simple bond or a group —COO— or —CONH—, wherein when z represents 0, W represents a simple bond, $R_1$, $R_2$ and $R_9$ represent independently H, a phenyl or a linear or branched alkyl having from 1 to 6 carbon atoms and optionally substituted with one or several halogens.

Preferably, in the formula (IV), W represents a simple bond and z represents 0. The monomer B1 is then a monomer bearing at least a vinylphosphonate function. B1 monomers bearing at least one vinylphosphonate function of the following formula (IV'):

(IV')

wherein:

R$_{26}$ represents a linear or branched alkyl having from 1 to 6 carbon atoms, P(=O)(OR$_1$)(OR$_2$), a hydrogen atom, a phenyl or a group —CN or —CO$_2$R$_9$, and R$_1$, R$_2$ and R$_9$ are as defined above, are particularly preferred.

From among the monomers B1 bearing at least one vinylphosphonate function useful in the present invention, notably vinyl phosphonic acid, dimethyl ester of vinyl phosphonic acid, bis(2-chloroethyl) ester of vinyl phosphonic acid, diphosphonic vinylidene acid, tetraisopropylester of diphosphonic vinylidene acid, or phosphonic alpha-styrene acid may be mentioned, or mixtures thereof.

The monomer B1 preferred according to the invention is vinyl phosphonic acid.

The monomers B1 with ethylenic unsaturation comprising a phosphonic mono or diacid function may be used in the form of a free acid, or in the form of their salts. They may be neutralized, partly or totally, optionally by an aminoalcohol or by an amine, for example dicyclohexylamine.

The block B may for example be obtained by polymerization of one or several monomers of formula (IV).

The block B may be obtained by polymerization of a mixture of monomers with ethylenic unsaturation comprising:
  at least one monomer B1 with ethylenic unsaturation comprising at least one phosphonate function, notably as defined above, and
  at least one other monomer with ethylenic unsaturation (preferably without any poly (alkylene oxide) group).

Generally, each block B of the block copolymer is obtained by polymerization of a mixture of monomers with ethylenic unsaturation comprising from 5 to 100% by weight of at least one monomer B1 with ethylenic unsaturation comprising at least one phosphonate function.

Preferably, each block B of the block copolymer is obtained by polymerization of a mixture of monomers with ethylenic unsaturation comprising at least 30% by weight, notably at least 40% by weight, for example at least 50% by weight, typically at least 75% by weight, for example at least 90% by weight and up to 100% by weight of monomer B1 with ethylenic unsaturation comprising at least one phosphonate function.

These other monomer(s) with ethylenic unsaturation may be a hydrophilic or ionic monomer B2 or a non-ionic monomer B3.

Preferably, each block B of the block copolymer is obtained by polymerization of a mixture of monomers comprising less than 10% by weight of non-ionic monomer B3. Each block B may be obtained by polymerization of a mixture of monomers without the non-ionic monomer B3.

From among the hydrophilic or ionic monomers B2, mention may be made of:
  the ethylenic unsaturated mono- and di-carboxylic acids such as acrylic acid, methacrylic acid, itaconic acid, maleic acid, or fumaric acid and their derivatives such as the mono-alkylesters preferably with C$_1$-0$_4$ alcohols, and amides such as acrylamide, methacrylamide, and anhydrides such as maleic anhydride, or
  the vinyl nitriles containing 3 carbon atoms, notably acrylonitrile;
  the ethylenic monomers comprising an ureido group such as ethylene-urea ethyl methacrylamide, or ethylene-urea ethyl methacrylate, or
  ethylenic monomers including a sulfonic acid group or one of its alkaline or ammonium salts, such as for example vinylsulfonic acid, vinylbenzene sulfonic acid, alpha-acrylamido-methylpropanesulfonic acid, or 2-sulfoethylene-methacrylate, or monomers bearing a boronic acid function such as p-vinylphenyl boronic acid, or cationic monomers selected from among aminoalkyl (meth)acrylates, aminoalkyl (meth)acrylamides; monomers comprising at least one secondary, tertiary or quaternary amine function, or a heterocyclic group containing a nitrogen atom; diallyldialkyl ammonium salts; these monomers being taken alone or as mixtures, as well as salts, the salts being preferably selected so that the counter-ion is a halide like for example a chloride, or a sulfate, a hydrosulfate, an alkylsulfate (for example comprising from 1 to 6 carbon atoms), a phosphate, a citrate, a formate, an acetate, such as dimethyl amino ethyl (meth)acrylate, dimethyl amino propyl (meth)acrylate, ditertiobutyl aminoethyl (meth)acrylate, dimethyl amino methyl (meth)acrylamide, dimethyl amino propyl (meth)acrylamide; ethyleneimine, vinylamine, 2-vinylpyridine, 4-vinylpyridine; trimethylammonium ethyl (meth)acrylate chloride, trimethylammonium ethyl acrylate methyl sulfate, benzyl dimethylammonium ethyl (meth)acrylate chloride, 4-benzoylbenzyl dimethyl ammonium ethyl acrylate chloride, trimethyl ammonium ethyl (meth)acrylamido chloride, trimethyl ammonium vinylbenzyl chloride; diallyldimethyl ammonium chloride, either alone or as mixtures, or their corresponding salts, or cyclic amides of vinylamine, such as N-vinylpyrrolidone and vinylcaprolactam, or vinyl monomers bearing ester groups, the hydrolysis of which leads to alcohol functions, for example like vinyl acetate, or more generally, monomers which may be made hydrophilic by chemical modification of a hydrophobic block, for example by hydrolysis of an alkyl acrylate into an acrylic acid, or a monomer with ethylenic unsaturation comprising a phosphonic or phosphonate function, for example a aminomethylene bisphosphonic function or gem-bisphosphonic function. Mention may for example be made of the monomers of the following formulae (X), (XI), (XII) and (XIII):

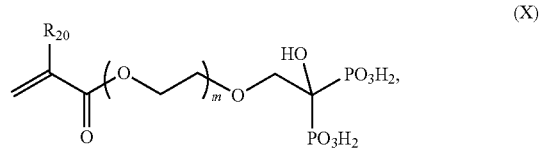

(X)

(XI)

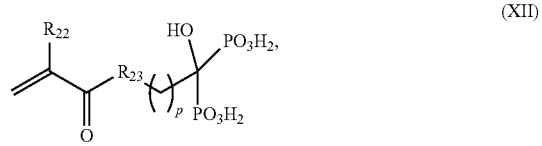

(XII)

-continued

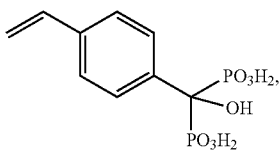
(XIII)

wherein:
$R_{20}$, $R_{21}$ and $R_{22}$ represent H or Me,
$R_{23}$ represents O or NH,
m and p represent an integer from 1 to 100.
or their salts. As an example of a monomer of formula (XII), mention may be made of the monomers from the reaction between (meth)acrylic acid and pamidronic acid or alendronic acid of the following formulae (XIIa) and (XIIb):

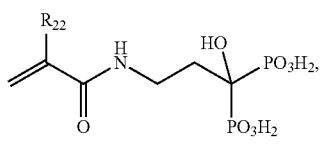
(XIIa)

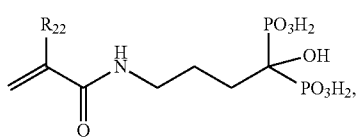
(XIIb)

wherein $R_{22}$ is as defined above.

Preferably, the hydrophilic or ionic monomers B2 are selected from among acrylic acid (AA), methacrylic acid, acrylamide (Am), N-vinylpyrrolidone, vinyl acetate, a monomer with an ethylenic unsaturation comprising an aminomethylene bisphosphonic or gem-bisphosphonic function, notably those defined above, a monomer with ethylenic unsaturation comprising a sulfonic or sulfonate function, such as 2-acrylamido-2-methyl-propanesulfonic acid (AMPS), styrene sulfonate (SS) or vinyl sulfonic acid (VSA), or mixtures thereof.

In a more preferential way, the hydrophilic or ionic monomers B2 are selected from among acrylic acid (AA), methacrylic acid, 2-acrylamido-2-methyl-propanesulfonic acid (AMPS), styrene sulfonate (SS) or vinyl sulfonic acid (VSA) and a monomer with ethylenic unsaturation comprising an aminomethylene bisphosphonic or gem-bisphosphonic function, notably those defined above.

From among the non-ionic monomers B3, mention may be made of:
derived styrenic monomers such as styrene, alphamethylstyrene, paramethylstyrene or paratertiobutylstyrene, or
esters of acrylic acid or methacrylic acid with $C_3$-$C_{12}$ alcohols, preferably $C_1$-$C_8$ possibly fluorinated alcohols, such as for example, propyl acrylate, n-butyl acrylate, isobutyl acrylate, 2-ethylhexyl acrylate, t-butyl acrylate, n-butyl methacrylate, isobutyl methacrylate,
vinyl nitriles containing from 4 to 12 carbon atoms, and notably methacrylonitrile,
vinyl esters of carboxylic acids, like vinyl acetate (VAc), vinyl versatate, or vinyl propionate, and
vinyl or vinylidene halides, for example vinyl chloride, vinyl fluoride, vinylidene chloride and vinylidene fluoride.

Preferably, the non-ionic monomers B3 of the block B are esters of acrylic acid with linear or branched $C_1$-$C_8$ alcohols, and in particular $C_1$-$C_4$ alcohols, such as for example methyl acrylate, ethyl acrylate, propyl acrylate, butyl acrylate (ABu) or 2-ethylhexyl acrylate (2EHA), fluorinated acrylates or else styrenic derivatives such as styrene, vinyl acetate (VAc), or vinyl chloride, or vinylidene chloride, or vinylidene fluoride.

Preferably, the other monomer(s) with ethylenic unsaturation is (are) one (some) hydrophilic or ionic monomer(s) B2 and include at least one COOH group and/or a phosphonic or phosphonate function and/or a sulfonic function. These groups have actually good affinity for hydraulic binders, and their presence improves the efficiency of the block copolymer according to the invention as plasticizer for hydraulic binders. For example, the other monomers may be acrylic acid, methacrylic acid, a monomer with ethylenic unsaturation comprising a sulfonic or sulfonate function (such as 2-acrylamido-2-methyl-propanesulfonic acid (AMPS), styrene sulfonate (SS) or vinyl sulfonic acid (VSA)), or a monomer with ethylenic unsaturation comprising an aminomethylene bisphosphonic or gem-bisphosphonic function (notably monomers of formulae (X), (XI), (XII) and (XIII) defined above).

According to a preferred embodiment of the invention, the block B is obtained by polymerization of a mixture of monomers with ethylenic unsaturation comprising:
at least one monomer B1 with ethylenic unsaturation comprising at least one phosphonate function, notably as defined above,
at least one monomer B2 selected from among acrylic acid, methacrylic acid, a monomer with ethylenic unsaturation comprising an aminomethylene bisphosphonic or gem-bisphosphonic function (notably monomers of formulae (X), (XI), (XII) and (XIII) defined above) or a monomer with ethylenic unsaturation comprising a sulfonic or sulfonate function (such as 2-acrylamido-2-methyl-propanesulfonic acid (AMPS), styrene sulfonate (SS) or vinyl sulfonic acid (VSA)).

For example, the block B is obtained by polymerization of a mixture of monomers with ethylenic unsaturation comprising:
from 30% to 100% by weight, preferably from 50 to 100% by weight of monomer B1 with ethylenic unsaturation comprising at least one phosphonate function, notably as defined above,
from 0% to 70% by weight, preferably from 0 to 50% by weight of monomer B2 selected from among acrylic acid, methacrylic acid, a monomer with ethylenic unsaturation comprising an aminomethylene bisphosphonic or gem-bisphosphonic function (notably monomers of formulae (X), (XI), (XII) and (XIII) defined above) and a monomer with ethylenic unsaturation comprising a sulfonic or sulfonate function (such as 2-acrylamido-2-methyl-propanesulfonic acid (AMPS), styrene sulfonate (SS) or vinyl sulfonic acid (VSA)).

Each block B may independently be a homopolymer (the block B then being obtained by polymerization of a monomer B1 with ethylenic unsaturation comprising at least one phosphonate function), a random copolymer, an alternating copolymer or a copolymer with a composition gradient.

The polymer of block B according to the invention generally has a degree of polymerization from 2 to 50, typically from 3 to 15, preferably from 3 to 10, for example 4 or 5 or 12. Polymerization degrees from 3 to 10, for example 4 or 5 are particularly preferred since the obtained block copolymers are dispersant agents and plasticizers which are particularly efficient.

The block B of the block copolymer according to the invention generally has an average molar mass comprised between 350 and 50,000 g/mol (Mw), preferably between 500 and 20,000 g/mol (Mw).

Generally, the block copolymers according to the invention have an weight-average molecular weight comprised from 450 to 100,000 g/mol preferably from 2,000 to 40,000 g/mol (Mw).

The mass ratio between blocks A and B is such that B/(A+B) is preferably from 0.1 and 5, and still more preferably from 0.1 to 1.

According to the invention, the mass ratio of the blocks A and B typically varies between 1/99 and 99/1.

In an embodiment, the block copolymer has one of the following formulae (SM02), (HD2) or (HD3):

(SM02)

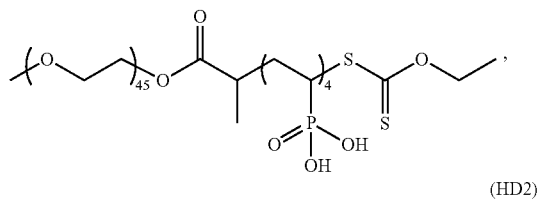

(HD2)

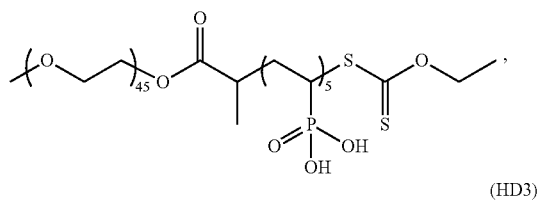

(HD3)

The block copolymers according to the invention may also be block copolymers obtained after hydrolysis of the terminal function of the block polymers described above (SM02, HD2, HD3), notably the obtained block copolymers after oxidation by $H_2O_2$, the terminal function then being for example oxidized into a sulfone ($SO_2R_{10}$) or sulfonic ($SO_3^-$ or $SO_3H$) group.

According to a second object, the invention relates to a method for preparing a block copolymer described above.

According to a first alternative, the method according to the invention comprises the steps of:

b) providing a compound of the following formula (V):

(V)

block A—L—S
         \
          C—R$_{10}$
         //
         S wherein:
block A is as defined above,
L is absent or is a binding group connecting covalently the block A and the group —S—(CS)R$_{10}$,
$R_{10}$ represents an alkyl, an arylalkyl, an aryl, an alkylaryl, a group OR$_{11}$, NR$_{12}$R$_{13}$ or SR$_{14}$,
$R_{11}$, $R_{12}$, $R_{13}$ and $R_{14}$ represent independently an alkyl or an alkenyl, an arylalkyl, an aryl, an alkylaryl, wherein $R_{12}$ and $R_{13}$ may be bound together in order to form a ring with the nitrogen atom which bears them,
c) for controlled radical polymerization, or for several successive controlled radical polymerizations, comprising the putting into contact:
of the compound of formula (V),
of a monomer B1 or of a mixture of monomers with ethylenic unsaturation comprising at least one monomer B1, where a monomer B1 is a monomer with ethylenic unsaturation comprising at least one phosphonate function, and
for a source of free radicals (also called initiator).

The preferred $R_{10}$ groups are alkyl, arylalkyl, aryl, alkylaryl or SR$_{14}$ groups.

$R_{12}$ and $R_{13}$ may be bound together in order to form a ring with the nitrogen atom which bears them. For example, the group NR$_{12}$R$_{13}$ may represent a pyrrolyl radical.

Step b) of the method according to the invention consists of providing a compound of formula (V).

The method may comprise, prior to step b), a step a) for preparing the compound of formula (V).

When the block A is obtained by polymerization of a monomer A1 or of a mixture of monomers with ethylenic unsaturation, comprising at least one monomer A1, wherein a monomer A1 is a monomer with ethylenic unsaturation and comprising at least one poly (alkylene oxide) group (for example a monomer A1 of formula (II) or (III)), the compound of formula (V) may be prepared:
either by a method comprising a controlled radical polymerization conducted by putting into contact:
a monomer A1 or a mixture of monomers with ethylenic unsaturation comprising at least one monomer A1, wherein a monomer A1 is a monomer with ethylenic unsaturation and comprising at least one poly (alkylene oxide) group,
a source of free radicals,
a control agent of the following formula (VI):

(VI)

R$_{15}$—S
       \
        C—R$_{10}$
       //
       S wherein $R_{10}$ is as defined above and $R_{15}$ represents an arylalkyl, an aryl, an alkylaryl or an alkyl optionally substituted with CN or with COOR$_{16}$, wherein $R_{16}$ represents an alkyl,
or by a method comprising the steps of:
a1) providing a polymer for which the main chain comprises at its end a functional terminal group and obtained by polymerization of a monomer A1 or of a mixture of monomers with ethylenic unsaturation comprising at least one monomer A1, wherein a monomer A1 is a monomer with ethylenic unsaturation and comprising at least one poly(alkylene oxide) group,
a2) grafting to the end of the main chain of said polymer a group of formula —S(C=S)R$_{10}$ wherein $R_{10}$ is as defined above.

The terminal group of the polymer applied in step a1) is functional, which allows grafting of a group of formula —S(C=S)R$_{10}$, either directly, or via a spacer group ("linker").

When the block A of the block copolymer according to the invention consist in a poly(alkylene oxide), notably in a poly(alkylene oxide) of formula (I), the step a) for preparing the compound of formula (V) comprises the steps of:

a3) providing a poly(alkylene oxide), notably a poly(alkylene oxide) of formula (I), a4) grafting to one end of said poly(alkylene oxide), a group of formula —S(C=S)R$_{10}$ wherein R$_{10}$ is as defined above.

Step c) of the method allows preparation of the block B of the block copolymer. The compound of formula (V) is used as a transfer agent in the radical polymerization controlled by RAFT of step c).

When the block copolymer is a diblock copolymer, the step c) comprises a single controlled radical polymerization. When the block copolymer comprises more than two blocks, step c) has several successive controlled radical polymerizations.

According to a second alternative, the method according to the invention comprises the steps of:

b') providing a compound of the following formula (V'):

wherein:
block B is as defined above,
L' is absent or is a binding group connecting covalently block B and the group —S—(CS)R'$_{10}$,
R'$_{10}$ represents an alkyl, an arylalkyl, an aryl, an alkylaryl, a group OR'$_{11}$, NR'$_{12}$R'$_{13}$ or SR'$_{14}$,
R'$_{11}$, R'$_{12}$, R'$_{13}$ and R'$_{14}$ represent independently an alkyl or an alkenyl, an arylalkyl, an aryl, an alkylaryl, wherein R'$_{12}$ and R'$_{13}$ may be bound together in order to form a ring with the nitrogen atom which bears them, c') a controlled radical polymerization, or several successive controlled radical polymerizations, comprising the putting into contact:
the compound of formula (V'),
a monomer A1 or a mixture of monomers with ethylenic unsaturation comprising at least one monomer A1, wherein a monomer A1 is a monomer with ethylenic unsaturation comprising at least one poly (alkylene oxide) group, and
a source of free radicals (also called an initiator).

The preferred R'$_{10}$ groups are alkyl, arylalkyl, aryl, alkylaryl or SR'$_{14}$ groups.

R'$_{12}$ and R'$_{13}$ may be bound together in order to form a ring with the nitrogen atom bearing them. For example, the group NR'$_{12}$R'$_{13}$ may represent a pyrrolyl radical.

The step b') of the method according to the invention consists of providing a compound of formula (V').

The method may comprise, prior to step b'), a step a') for preparing the compound of formula (V').

The compound of formula (V') may be prepared:
either by a method comprising controlled radical polymerization conducted by putting into contact:
a monomer B1 or a mixture of monomers with ethylenic unsaturation comprising at least one monomer B1, wherein a monomer B1 is a monomer with ethylenic unsaturation and comprising at least one phosphonate function,
a source of free radicals,
a control agent with the following formula (VI'):

wherein R'$_{10}$ is as defined above and R'$_{15}$ represents an arylalkyl, an aryl, an alkylaryl or an alkyl optionally substituted with CN or with COOR'$_{16}$ wherein R'$_{16}$ represents an alkyl, or by a method comprising the steps of:
a1') providing a polymer for which the main chain comprises at its end a functional terminal group and obtained by polymerization of a monomer B1 or of a mixture of monomers with ethylenic unsaturation comprising at least one monomer B1, wherein a monomer B1 is a monomer with ethylenic unsaturation and comprising at least one phosphonate function, a2') grafting to the end of the main chain of said polymer a group of formula —S(C=S)R'$_{10}$ wherein R'$_{10}$ is as defined above.

The terminal group of the polymer applied in step a1') is functional, which gives the possibility of grafting a group of formula —S(C=S)R'$_{10}$, either directly, or via a spacer group ("linker").

The step c') of the method gives the possibility of preparing the block A of the block copolymer. The compound of formula (V') is used as a transfer agent in the radical polymerization controlled by RAFT of step c').

When the block copolymer is a diblock copolymer, the step c') comprises a single controlled radical polymerization. When the block copolymer comprises more than two blocks, step c') comprises several successive controlled radical polymerizations.

Typically, at the end of step c) or of step c'), a block copolymer is obtained for which the end is functionalized with a group —S—(C=S)—R$_{10}$ or S—(C=S)—R'$_{10}$ wherein R$_{10}$ and R'$_{10}$ are as defined above. This block copolymer may be used as such, or else the method may comprise after step c) or c') an oxidation step d) (for example with hydrogen peroxide), generally for obtaining a block copolymer for which the end is functionalized by a group SO$_3$H, SO$_3^-$, SO$_2$R'$_{10}$ or SO$_2$R$_{10}$.

The invention also relates to the block copolymer which may be obtained by the method according to the invention.

According to a third object, the invention relates to the use of a block copolymer as defined above (or which may be obtained by the method defined above), as a dispersant agent of mineral particles, as a plasticizer for suspensions of mineral particles, as an adhesion promoter (notably on metals), as an anticorrosion agent, as a flame-retardant agent, as a stabilizing agent during the milling of mineral particles, or as an anti-scale agent. These copolymers are used with from 0.01 to 10%, preferably from 0.1% to 5% by weight based on the weight of the mineral particles.

The mineral particles may notably be mineral fillers or mineral pigments (for example mineral oxides such as titanium dioxide or iron oxide), calcium salts, in particular calcium sulfate. These particles are generally suspended in an aqueous medium. The suspensions of such mineral particles are for example used as inks, paints, products for coating paper, or formulations for rubbers or for synthetic resins or compositions comprising a hydraulic binder.

The block copolymers according to the invention are particularly useful as a fluidifying agent (also designated as plasticizer or super-plasticizer) for compositions comprising a hydraulic binder such as cement. The compositions comprising a hydraulic binder are used for preparing hydraulic compositions, such as mortars, concretes and screeds. Generally, the block copolymer is used in proportions from 0.2 to 2% as a dry extract of the composition comprising a hydraulic binder.

By the term of "hydraulic binder" is meant any compound having the property of becoming hydrated in the presence of water and for which hydration gives the possibility of obtaining a solid having mechanical characteristics, notably a cement such as Portland cement, aluminous cement, Pozzolana cement or further an anhydrous or semi-hydrated calcium sulfate. The hydraulic binder may be a cement according to the EN197-1 standard (2001) and notably a Portland cement, mineral additions, notably slags, or a cement comprising mineral additions.

By "cement" is meant a cement according to the EN 197-1 standard (2001) and notably a cement of the CEM I, CEM II, CEM III, CEM IV or CEM V type according to the Cement standard NF EN 197-1 (2012). The cement may comprise mineral additions.

The expression «mineral additions» refers to the slags (as defined in the Cement standard NF EN 197-1(2012) paragraph 5.2.2), steelwork slags, pozzolan materials (as defined in the Cement standard NF EN 197-1(2012) paragraph 5.2.3), flying ashes (as defined in the Cement standard NF EN 197-1(2012) paragraph 5.2.4), calcined shales (as defined in the Cement standard NF EN 197-1 (2012) paragraph 5.2.5), lime stones (as defined in the Cement standard NF EN 197-1(2012) paragraph 5.2.6) or further silica fumes (as defined in the Cement standard NF EN 197-1(2012) paragraph 5.2.7) or mixtures thereof. Other additions, presently not recognized by the Cement standard NF EN 197-1(2012), may also be used. These are notably metakaolins, such as metakaolins of type A according to the standard NF P 18-513 (August 2012), and siliceous additions, such as the siliceous additions of mineralogy Qz according to the standard NF P 18-509 (September 2012).

Without intending to be bound to a particular theory, the fluidifying properties of the block copolymers according to the invention may be explained by the fact that block A plays the role of a stabilizer block and that block B plays the role of an anchoring block by being adsorbed on the cement grains.

The block A has little, or even no affinity for mineral particles. The poly (alkylene oxide) groups of the block(s) A are hydrophilic and would avoid flocculation of the cement grains by steric stabilization.

The phosphonate functions and the optional carboxylate functions of block B interact with calcium ions present at the surface of the mineral particles, in particular of the cement, which would cause anchoring of the block(s) B on the grains of mineral particles.

According to a fourth object, the invention relates to an adjuvant comprising a block copolymer as defined above (or which may be obtained by the method defined above) and a solvent, preferably an aqueous, alcoholic or hydroalcoholic solvent.

The concentration of the polymer adjuvant mainly depends on the contemplated application. Generally, the adjuvant comprises from 1 to 50, preferably from 10 to 30% by weight of polymer based on the total weight.

Alternatively, the adjuvant may also be shown in a dry form, notably as a powder.

The formulation of the adjuvant may moreover comprise other usual additives, such as anti-foam agents, accelerators, retardants, water-repellent agents, de-aerating agents, viscosity-modifying agents, other dispersants, air entrainers or anti-foam agent stabilizers.

According to a fifth embodiment, the invention also relates to a composition of mineral particles comprising at least one copolymer according to the invention. The mineral particles may notably be mineral fillers or mineral pigments (for example mineral oxides such as titanium dioxide or iron oxide), calcium salts, in particular calcium sulfate. The compositions of mineral particles may notably be hydraulic binder compositions.

The figures and examples below illustrate the invention.

The FIGURE illustrates the time-dependent change in the amount of polymer adsorbed on cement particles (in mg/g) versus the concentration of free polymer in mg/L for a polymer CHRYSO®Fluid Optima100 (comparative—rhombuses), HD2 (triangles), HD3 (squares) and SM02 (circles). The arrow shows the increase in the number of $PO_3^{2-}$ functions.

EXAMPLE 1: SYNTHESIS OF A POE-b-PVPA (POLYVINYL PHOSPHONIC ACID) COPOLYMER

In this example, the copolymer is a diblock polymer with:
a block A of formula

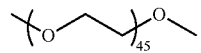

a block B obtained by homopolymerization of vinyl phosphonic acid, the blocks A and B being bound through a junction units of formula —(C═O)—CHME—

1.1. Preparation of the Transfer Agents of Formula

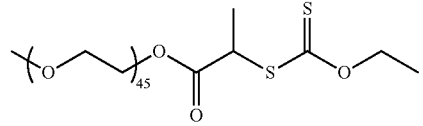

(a compound fitting formula (V)) (steps a3) and a4) of the method according to the invention).

The ω-hydroxy end of the poly(ethylene oxide) was modified by a xanthate group (2-bromopropionate bromide). The synthesis was carried out from a commercial methoxy-polyethylene glycol homopolymer of molar mass 2012 g·mole$^{-1}$ (DP=45) in dichloromethane at room temperature (20° C.) for 12 h in the presence of triethylamine. In a first phase, it is reacted with the dibrominated compound of the following formula

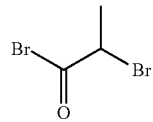

in order to obtain a polymer terminated by a halogen functionality instead of the hydroxyl function, as illustrated in the scheme 1 below.

Scheme 1: Introductin of a halogen functionality on one of the ends of the poly(ethylene oxide).

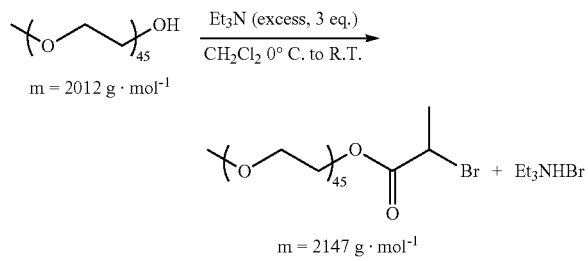

In a second step, the xanthate functionality is introduced according to the reaction of scheme 2.

Scheme 2: Introduction of a xanthate functionality on one of the ends of the poly(ethylene oxide).

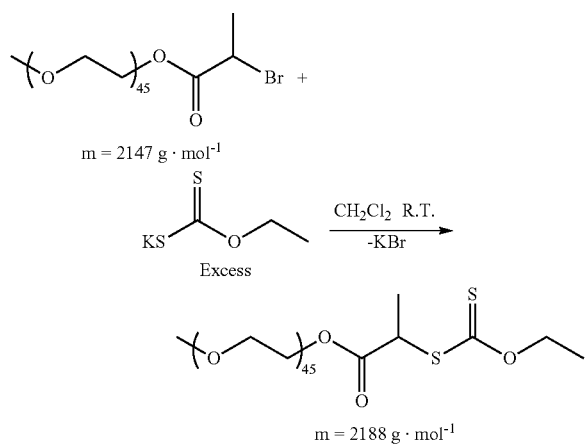

$^1$H NMR spectroscopic analysis 400 MHz confirm the disappearance of the hydroxyl terminal group of the poly (ethylene oxide) and the appearance of a xanthate group.

The product appears after purification as a powder of beige color. The total yield of the synthesis was close to 80%. The $^1$H NMR analysis confirm that all the polyethyleneglycol polymers were terminated by the RAFT functionality. This polymer was then used as a macro-RAFT agent for polymerizing vinylphosphonic acid.

1.2. Polymerization of Vinylphosphonic Acid (Step c))

The polymerization of vinylphosphonic acid (VPA) was initiated with AIBA [V50=2,2'-azo-bis-(2-amidinopropane) hydrochloride of the following formula:

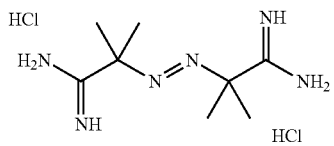

at 65° C. in water in the presence of the POE-xanthate block.

The analysis of the reaction crude material with $^{31}$P showed that residual VPA remained in a non-negligible amount. The operating conditions were optimized for minimizing the residual vinylphosphonic acid level.

Three tests were carried out by using the transfer agent prepared in 1.1. as a macro-RAFT agent. The polymerization of the VPA was carried out at 65° C. in water. The conversion attains the limit of 58% after 24 h. The product was purified by ultrafiltration, in order to for result in a copolymer having less than 2% of residual vinylphosphonic acid monomer.

The $^1$H and $^{31}$P NMR spectroscopic analyses confirm the obtaining of a polyvinylphosphonic acid block with degrees of polymerization DP of respectively 4 (SMO2-block copolymer 1), of 5 (HD2-block copolymer 2) and of 12 (HD3-block copolymer 5).

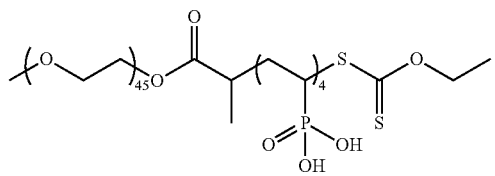

SM02 block copolymer 1

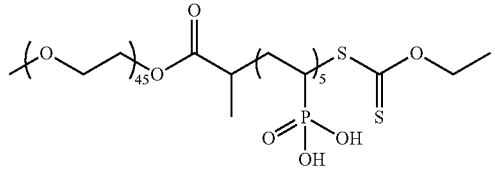

HD2 block copolymer 2

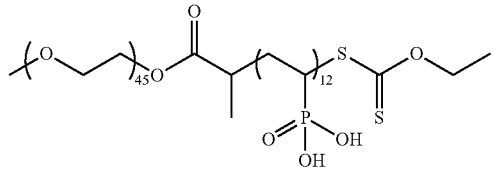

HD3 block copolymer 3

The obtained diblock copolymers were then formulated by adding 0.5% by weight of oleic amine to 2 moles of ethylene oxide (marketed under the name of NORAMOX O$_2$ by CECA) and of 1.2% by weight of tributylphosphate (antifoam agent).

Finally, the products were diluted with water in order to obtain a 20% dry extract, and then neutralized with sodium hydroxide at pH 7. The thereby prepared dispersants are ready-to-use.

EXAMPLE 2: DETERMINATION OF THE ADSORPTION ISOTHERMS OF DIBLOCK COPOLYMERS OF EXAMPLE 1 AT THE SURFACE OF THE CEMENT PARTICLES

The diblock polymers of Example 1 were tested with an approach which combines a rheology study for 2 hours with measurements of adsorption of the molecules on the cement particles.

The rheometer Kinexus (Malvern Instruments, UK) was programed for conducting measurements of the stress versus the shear gradient (flow curves) after destructuration of the cement slurry at 5', 60' and 120'. Between two measurements of the flow curve, the apparatus performed a creep curve, i.e. recorded the time-dependent change of the viscosity, therefore the tendency to structuration given by hydration of the cement, under a constant stress of 4 Pa. In synchronization with the flow curves, about 5 ml of cement juice were extracted by centrifugation of the slurry (2 mins at 5,000 rpm) and filtered (0.2 µm Nylon) in order to obtain a clean solution.

The solutions were diluted and analyzed by measurement of Total Organic Carbon (TOC) for detecting the amount of polymer which remains in the interstitial liquid. The difference in the values of TOC before and after contact with the cement gives the amount of adsorbed polymer.

The cement slurry was prepared with a Krups kneader according to the proportions reported in table 1.

TABLE 1

| Composition of the slurry (g ± 0.02) | | | | |
|---|---|---|---|---|
| CEM I 52.2N Le Havre | Filler Erbray | Water | Sand 0/0.160 mm | Sand 0/0.315 mm |
| 254.55 | 145.45 | 167.35 | 36.15 | 163.85 |

The diblock molecules were dosed between 0.8% and 2% over the mass of the total binder (cement+filler). These different dosages gave the possibility of plotting the values of adsorbed polymer versus the free polymer concentration, therefore for obtaining an adsorption isotherm.

The curves obtained in FIG. 1 correspond to the adsorption isotherms of the polymers on the cement particles. They very clearly show that HD3, with 12 units of vinylphosphonic acid, has a greater affinity for the cement grains than HD2 and SM02 which only respectively have 5 and 4 phosphonic acid units. CHRYSO® Fluid Optima 100 is the less adsorbed polymer.

EXAMPLE 3: USE OF THE DIBLOCK COPOLYMERS OF EXAMPLE 1 IN A FORMULATION OF A CEMENT SLURRY

Composition of the Evaluation Formulation

The diblock copolymers of Example 1 were evaluated according to the following formulation:

| | |
|---|---|
| CEM I 52.5N Le Havre | 624.9 g |
| ERBRAY lime stone filler | 412.1 g |
| FULCHIRON (sand) | 587.7 g |
| Standardized sand AFNOR | 1,350 g |
| Total water | 375.1 g |

The copolymer level is expressed in % based on the total binder (filler+cement=1,037 g).

Operating Procedure for Preparing the Mortar

The mortar was prepared according to the following procedure: two sands, standardized and FULCHIRON sand were introduced into the bowl of the kneader PERRIER. After kneading the sands for 30 seconds at a rate of about 140 rpm, within 15 seconds, we added the pre-wetting water which represented ⅓ of the total water to be introduced. The mixture was continued for 15 seconds before leaving at rest the mass for 4 minutes. Next, the cement and the lime stone filler (origin ERBRAY provided by MEAC) were introduced and then the mixing was continued for 1 minute before adding the remainder of the mixing water as well as the totality of the adjuvant within 30 seconds. The kneader was then stopped for a few instants so as to scrape the edges of the kneading bowl in order to have a quite homogeneous mass and then mixing was continued for a further 1 minute at a rapid rate of 280 rpm.

Evaluation Criterion

The evaluation of the application properties of the block copolymers was carried out by means of rheological measurements. Thus the workability of the hydraulic compositions formulated in the presence of these diblock copolymers was estimated by measuring the slump flow diameter (slump flow-diameter of the pool formed after flowing). The spreading was measured after 5, 30, 60, 90 and 120 mins along 2 diameters at 90°. The tests were conducted at 20° C.

Results

The spreading-out measurements of the cement slurries are shown in table 2.

TABLE 2

| Spreading out of the mortar depending versus the adjuvant. | | |
|---|---|---|
| Adjuvant | Optima 100 (reference) | HD2 |
| Dosage (%) | 1.10 | 1.10 |
| Spread after 5 mins | 290 | 410 |

Upon examining table 2, it is noticed that the diblock copolymer poly(ethylene oxide—b-polyvinylphosphonic acid) HD2 has, for equal dosage, a fluidifying power much greater than that of the control Optima 100.

The invention claimed is:

1. A method for preparing a block copolymer comprising:
at least one block A consisting of poly (alkylene oxide) groups, and
at least one block B obtained by polymerization of a monomer B1 or of a mixture of monomers with ethylenic unsaturation comprising at least one monomer B1, wherein a monomer B1 is a monomer with ethylenic unsaturation comprising at least one phosphonate function comprising the steps of:
providing a poly(alkylene oxide),
grafting at one end of said poly(alkylene oxide) a group of formula —S(C=S)$R_{10}$ to obtain a compound of the following formula (V):

(V)

wherein:
block A consists of poly (alkylene oxide) groups,
L is absent or is a binding group connecting covalently the block A and the group —S—(CS)$R_{10}$,
$R_{10}$ represents an alkyl, an arylalkyl, an aryl, an alkylaryl or a group $OR_{11}$, $NR_{12}R_{13}$ or $SR_{14}$,
$R_{11}$, $R_{12}$, $R_{13}$ and $R_{14}$ represent independently an alkyl or an alkenyl, an arylalkyl, an aryl, an alkylaryl, wherein $R_{12}$ and $R_{13}$ may be connected together in order to form a ring with the nitrogen atom bearing them,
effecting controlled radical polymerization, or several successive controlled radical polymerizations, comprising putting into contact:
the compound of formula (V),
a monomer B1 or a mixture of monomers with ethylenic unsaturation comprising at least one monomer B1, wherein a monomer B1 is a monomer with ethylenic unsaturation comprising at least one phosphonate function, and a source of free radicals.

2. The preparation method according to claim 1, wherein the monomer B1 has the following formula (IV):

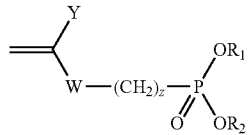

wherein:

Y represents:
- a linear or branched alkyl having from 1 to 6 carbon atoms,
- a group —W—$(CH_2)_z$—P(=O)($OR_1$)($OR_2$), or
- a group $(CH_2)_x$—$R_{25}$, wherein x represents an integer comprised between 0 and 4 and $R_{25}$ represents a hydrogen atom, a phenyl or a group —CN or —$CO_2R_9$, z represents an integer comprised between 0 and 4, W represents a simple bond or a group —COO— or —CONH—, wherein when z represents 0, W represents a simple bond, $R_1$, $R_2$ and $R_9$ represent independently H, a phenyl or a linear or branched alkyl having from 1 to 6 carbon atoms and optionally substituted with one or several halogens.

3. The preparation method according to claim 2, wherein W represents a simple bond and z represents 0.

4. The preparation method according to claim 3, wherein the monomer B1 is vinyl phosphonic acid.

5. The preparation method according to claim 1, wherein, during said effecting controlled radical polymerization, the mixture of monomers with ethylenic unsaturation comprising at least one monomer B1 comprises:
at least one monomer B1 with ethylenic unsaturation comprising at least one phosphonate function, and
at least one monomer B2 selected from acrylic acid, methacrylic acid, a monomer with ethylenic unsaturation comprising an aminomethylene bisphosphonic or gem-bisphosphonic function or a monomer with ethylenic unsaturation comprising a sulfonic or sulfonate function.

6. The preparation method according to claim 1, comprising, after said effecting controlled radical polymerization, an oxidation step.

* * * * *